United States Patent [19]
Strzelichowski et al.

[11] Patent Number: 5,828,189
[45] Date of Patent: Oct. 27, 1998

[54] PROCESS AND APPARATUS FOR MAGNETIZING A MAGNETIC RING FOR STATIC CONVERGENCE CORRECTION IN A CRT

[75] Inventors: Wieslaw Strzelichowski, Farmington Hills, Mich.; Samuel Sunwhee Chung, Knoxville, Tenn.

[73] Assignee: Philips Electronics North America Corporation, New York, N.Y.

[21] Appl. No.: 767,097

[22] Filed: Dec. 4, 1996

[51] Int. Cl.$^6$ .............................. G09G 1/28; H01J 29/51

[52] U.S. Cl. ............................ 315/368.24; 315/368.25; 315/368.27

[58] Field of Search .................... 315/368.11, 368.24, 315/368.25, 368.27, 268.28

[56] References Cited

U.S. PATENT DOCUMENTS

4,636,694   1/1987   De Paolis et al. .................. 315/368.25

*Primary Examiner*—Gregory C. Issing
*Attorney, Agent, or Firm*—John C. Fox

[57] ABSTRACT

A process and apparatus are described for custom magnetizing a magnetic ferrite ring on the outside of the neck of a color cathode ray tube (CRT), in order to provide correction of convergence, color purity and frame errors in the CRT. The two step process provides for a first coarse correction step and a second fine correction step, each step involving bringing the ring to an initial state of magnetic saturation, and then custom magnetizing the ring using a series of high power AC pulses and low power DC offsetting fields, via cylindrical coils positioned around the periphery and in close proximity to the ring.

23 Claims, 6 Drawing Sheets

PROCESS AND APPARATUS FOR MAGNETIZING A MAGNETIC RING FOR STATIC CONVERGENCE CORRECTION IN A CRT

CROSS REFERENCE TO RELATED APPLICATIONS

U.S. patent application Ser. No. 08/767,098, filed Dec. 4, 1996 (attorney docket no. 5604-0393) relates to a magnetic ferrite ring and holder for static convergence correction of a cathode ray tube (CRT), which is suitable for use with the ferrite ring and holder which are the subject matter of the present application.

BACKGROUND OF THE INVENTION

This invention relates to cathode ray tubes (CRTs) for color television and other color displays, such as data/graphic displays, and more particularly relates to method and apparatus for magnetizing a magnetic ring for static convergence correction of such a CRT.

CRTs for color television and related applications employ a display screen made up of a repetitive pattern of triplets of cathodoluminescent phosphor elements, each triplet including one element for each of the primary colors red, blue and green. Conventionally, the elements are in the form of closely spaced vertical stripes. The screen is activated by simultaneously sweeping three electron beams across the display screen, each beam modulated in intensity in accordance with a display signal corresponding to one of the three primary color components (red, blue, green) of the image to be displayed. In order to insure that each of the beams lands only on the phosphor elements of the corresponding color, a mask having a large number of apertures is positioned a short distance behind the screen in a manner so that there is registration between the electron beams, the apertures in the mask and the corresponding phosphor elements on the screen.

In a conventional color CRT, the number of individual picture elements or pixels, which are defined by the apertures in the mask, is typically about 250,000 or more. The large number and small size of these pixels enables the eye of the observer of the display to integrate the separate red, blue and green elements into a full color image at normal viewing distances.

Registration between the mask apertures and screen elements is critical to obtaining a high quality display image. Such registration is achieved by mounting the aperture mask behind the glass display window, and then using the mask as a photomask to form the screen in situ on the window using photolithographic techniques. The mask and screen are thus "married", and remain together throughout the remainder of the manufacturing process.

Accurate placement and alignment of the electron gun in the neck of the CRT envelope are also critical to achieving registration of the electron beams with the proper phosphor elements on the screen.

It will be appreciated that despite careful controls imposed at every step of the manufacturing process, some incidences of misalignments will inevitably occur. Once the manufacturing process has been completed, there is no longer any opportunity to adjust the alignment of the mechanical components inside the CRT envelope. However, the alignment of the electron beams can be adjusted. This is customarily done by placing permanent magnets on the outside of the neck in proximity to the electron gun, and adjusting the relative positions of these magnets until so-called "static convergence" is achieved. Static convergence is defined as the condition in which the three electron beams land in the center of the display screen, in the absence of any beam deflection current.

Such static convergence correction as well as correction of color purity and frame errors, has in the past been carried out manually, by adjusting the positions of a series of multipole magnetic rings with respect to the beams and to each other, resulting in significant labor costs as well as human errors. Attempts have been made to automate this step of the manufacturing process. See for example, U.S. Pat. Nos. 4,027,219; 4,105,983 and 4,220,897. In particular, U.S. Pat. No. 4,220,897 describes a method of correcting convergence errors, as well as color purity and frame errors which involves inducing a customized magnetization pattern in a convergence correcting device such as a single metal alloy ring, located for example inside the top cup of the electron gun.

While such method represents a significant improvement over the manual adjustment of premagnetized rings on the neck of the CRT, in practice it has been found to result in variations from CRT to CRT, due to positional variations of the magnetization apparatus relative to the rings, and to variations in the gap between the nearly abutting ends of the internal magnetic rings. In addition, the internal magnetic rings are made of a magnetic metal alloy, such as an iron-cobalt alloy, which although considerably easier to magnetize than non-metallic ring materials, such as ferrite, is nevertheless considerably more expensive to purchase and fabricate.

As the competition between various CRT manufacturers intensifies, it becomes increasingly important to minimize as much as possible such tube-to-tube variations in static convergence, and to do so at minimal cost.

OBJECTS AND SUMMARY OF THE INVENTION

Accordingly, it is an object of the invention to provide a method and apparatus for inducing a customized magnetization pattern in a magnetizable ring located on or inside the neck of a color CRT, for achieving correction of static convergence errors, as well as color purity and frame errors, which method and apparatus result in a minimal variation in static convergence from CRT to CRT, and at minimal cost.

It is another object of the invention to provide a method and apparatus for inducing a customized magnetization pattern in a magnetizable ring such as a ferrite ring located on the neck of a color CRT, for achieving static convergence correction.

In accordance with one aspect of the invention, a process is provided for achieving static convergence in a CRT by inducing a customized magnetization pattern in a magnetizable ring such as a ferrite ring mounted in the vicinity of the exit end of the electron gun of the CRT, in which process:

(a) the ring is subjected to a first plurality of localized magnetic fields about the periphery of the ring, each localized field characterized by a series of decaying high power magnetic pulses of alternating positive and negative polarity (herein referred to as "AC pulses"), beginning with an initial pulse of sufficient amplitude to induce a state of magnetic saturation in the ring, and continuing with subsequent pulses of decaying amplitude, the amplitudes of the subsequent AC pulses being sufficient to achieve a coarse convergence correction within a statistical range for CRTs of the same type as that being corrected; and (b) the ring is subjected to a second plurality of localized magnetic fields similar to the first plurality of localized fields, except that each localized field is characterized by a positive or negative DC offset predetermined to adjust the ring magnetization to correct any convergence error remaining in the CRT after the coarse correction.

The use of such AC pulses has been found to promote the development of stable domains in the ferrite ring material.

Preferably, the localized fields are achieved by alternately applying positive-going and negative-going current pulses to each of a set of magnetic coils, for example, by sequentially discharging a series of capacitors charged to predetermined levels into each coil.

The amount of DC offset needed for fine correction of the static convergence error of the CRT is determined by measuring the residual convergence error after the coarse correction, and then calculating the DC offset needed for each coil to achieve convergence.

The polarities of adjacent coils are opposed to one another so that the magnetic pulses of the adjacent coils will have a neutralizing effect resulting in no measurable magnetization in the regions of the magnetic ring between these adjacent coils.

Due to the low magnetic permeability and consequently the large amount of power needed to magnetize a ferrite ring (on the order of 250 kilowatts peak power for a ferrite ring vs. about 2 kilowatts for a metal ring), each step should be completed within a total time of between about 1 and 2 seconds, in order to avoid excessive heat build-up in the coils. Thus, the number and duration of the peaks, as well as the duration between peaks should be chosen accordingly.

In general, it has been found that good convergence correction can be achieved if the steps of coarse and fine correction of a ferrite ring are each carried out using a series of from three to five decaying pulses, for example, four pulses decaying from an initial peak above 30 kiloGauss (to induce a state of magnetic saturation in the ring), with a duration of each pulse of from about 0.1 to about 50 milliseconds, for example, 5 milliseconds, and a delay between successive pulses of from about 15 milliseconds to about 1 second, for example 25 milliseconds.

The rate of decay of remaining pulses to achieve the desired correction can be described by the following relationship:

$$(An+1)/An = 1 - 1/p \qquad (1)$$

where An is the amplitude of the nth peak and p is the total number of peaks.

The amplitude of the successive peaks should be controlled to an accuracy of within 0.1 percent in order to achieve good convergence correction.

Preferably, the steps of coarse and fine correction are carried out using a magnetic head of a compact circular arrangement of six to twelve, for example eight, cylindrical coils oriented so that the coil ends are proximate to the ring to be magnetized.

Preferably, the coils have an air core, which exhibit a linear relationship between coil current and magnetic field strength, thus simplifying the initial calibration of the coils and the subsequent calculation of the necessary DC offset currents. Coils with solid cores typically exhibit non-linear relationships between current and field strength, making such calibrations more difficult. Moreover, such coils may have an adverse effect on the CRT beam deflection unit.

The DC offset, which is calculated from the measured convergence error, may vary from zero up to about 50 Gauss, but is set with an accuracy within one milliGauss. The exact DC offset is determined for each coil by the method described in U.S. Pat. No. 4,220,897, the entire specification of which is incorporated by reference herein.

Both AC pulse and DC offset currents may be fed into each coil, instead of having separate coils for AC and DC, respectively, thus simplifying the hardware arrangement.

This magnetizing method has been found to be particularly suitable for the custom magnetization of a ferrite ring, which is considerably less expensive than a metal alloy ring, and can easily be fabricated into continuous rings, which exhibit less variation in magnetization from ring to ring than metal alloy rings having a gap between abutting ends of the ring.

In accordance with another aspect of the invention, there is provided an apparatus for carrying out the magnetizing method described above, such apparatus having a series of magnetization coils mounted in a circular arrangement to surround the ring during magnetization. A unique feature of this apparatus is that both AC and DC pulses are fed into each coil, eliminating the need to have separate coils for AC pulses and DC pulses.

In order to achieve the best convergence results with ferrite rings, the apparatus should be capable of generating currents of 500 to 1000 amperes per coil in the magnetizing head, resulting in a magnetic field strength of around 30 kiloGauss or higher in the ring area.

In accordance with another aspect of the invention, the magnetization coils are tapered at one end to permit a compact arrangement of the coils into a magnetic head, thereby to enhance the proximity of the coil ends to the ring to be magnetized, and to enable a more accurate placement and lower field strengths to achieve the required magnetization.

BRIEF DESCRIPTION OF THE DRAWINGS

The invention will now be described in detail with reference to the drawings, in which.

DESCRIPTION OF THE PREFERRED EMBODIMENTS

Figure 1:
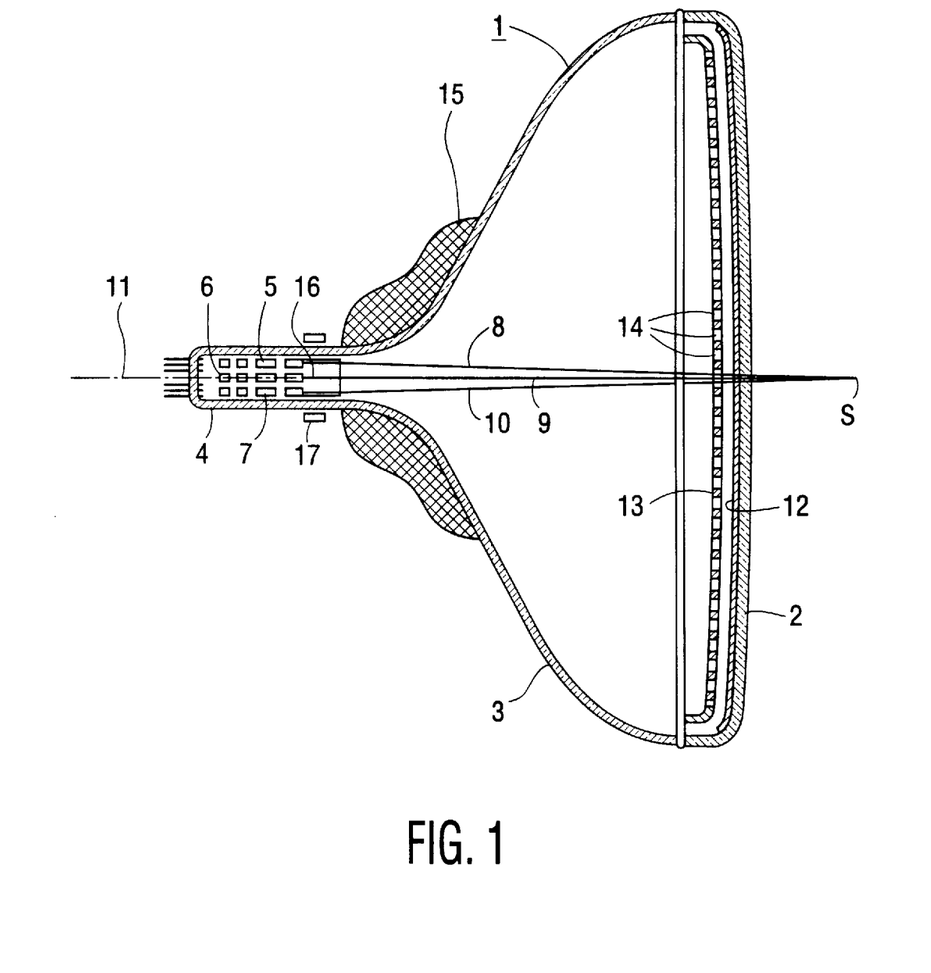
FIG. 1 is a diagrammatic sectional view of a known color CRT of the "in-line" type having an external static convergence ring.

FIG. 1 is a diagrammatic sectional view of a known color display tube of the "in-line", type. Three electron guns 5, 6 and 7, generating the electron beams 8, 9 and 10, respectively, are accommodated in the neck 4 of a glass envelope 1 which is composed of a display window 2, a funnel-shaped part 3 and a neck 4. The axes of the electron guns 5, 6 and 7 are situated in one plane, the plane of the drawing. The axis of the central electron gun 6 coincides substantially with the tube axis 11. The three electron guns are seated in a sleeve 16 which is situated coaxially in the neck 4. The display window 2 has on the inner surface thereof a large number of triplets of phosphor lines. Each triplet comprises a line of a phosphor luminescing green, a line of a phosphor luminescing blue, and a line of a phosphor luminescing red. All of the triplets together constitute a display screen 12. The phosphor lines are normal to the plane of the drawing. A shadow mask 12, in which a very large number of elongate apertures 14 are provided through which the electron beams 8, 9 and 10 pass, is arranged in front of the display screen 12. The electron beams 8, 9 and 10 are deflected in the horizontal direction (in the plane of the drawing) and in the vertical direction (at right angles thereto) by a system 15 of deflection coils. The three electron guns 5, 6 and 7 are assembled so that the axes thereof enclose a small angle with respect to each other. As a result of this, the generated electron beams 8, 9 and 10 pass through each of the apertures 14 at said angle, the so-called color selection angle, and each impinge only upon phosphor lines of one color.

A display tube has a good static convergence if the three electron beams, when they are not being deflected, intersect each other substantially in the center of the display screen. It has been found, however, that the static convergence often is not good, no more than the frame shape and the color purity, which may be the result of an insufficiently accurate assembly of the guns, and/or sealing of the electron guns, in the tube neck. In order to produce the static convergence, so far, externally adjustable correction units have been added to the tube. They consist of a number of pairs of multipoles consisting of magnetic rings, for example four two-poles (two horizontal and two vertical), two four-poles and two six-poles. The rings of each pair are coupled together by means of a pinion transmission, with which the rings are rotatable with respect to each other to an equal extent. By rotating the rings with respect to each other and/or together, the strength and/or direction of the two-, four- or six-pole field is adjusted. It will be obvious that the control of a display tube with such a device is complicated and time-consuming. Moreover, such a correction unit is material-consuming since, for a combination of multipoles, at least eight rings are necessary which have to be provided around the neck so as to be rotatable with respect to each other.

In accordance with the invention, such manually adjustable rings are replaced by a single magnetic ring 17, which has been magnetized by the two step method of coarse and fine convergence correction as described herein.

Figure 2:
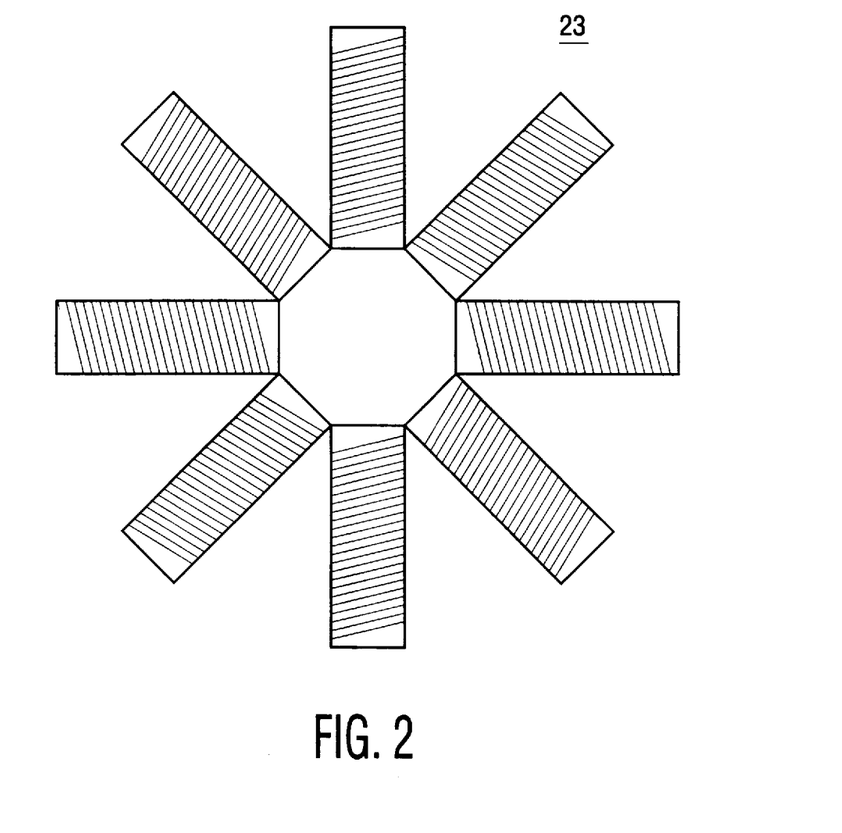
FIG. 2 is a plan view of a magnetizing head for magnetizing the external ring of a CRT of the type shown in FIG. 1, including eight magnetizing coils.
Figure 9:
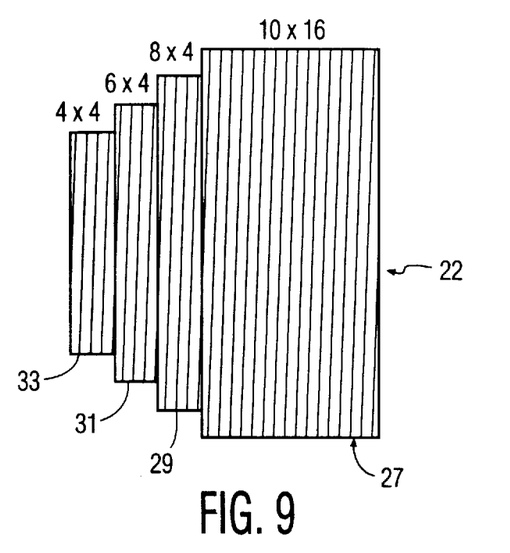
FIGS. 9 and 10 are end and plan views respectively, of one of the coils of the magnetizing head of FIG. 2.
Figure 10:
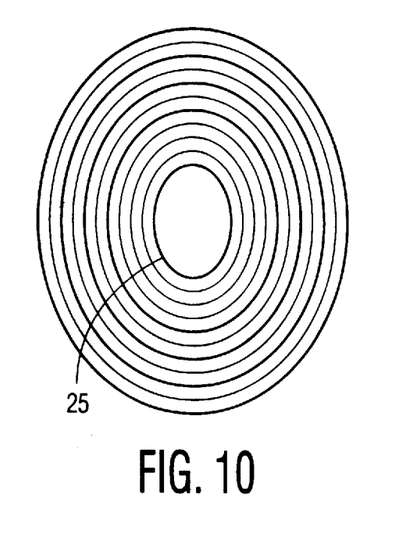

In order to magnetize ring 17, eight coils 22 are arranged in a compact circular pattern to form magnetizing head 23, as shown in FIG. 2. In accordance with one aspect of the invention, the coils are tapered inward toward the center of the head 23, in order to enhance the proximity of the coil ends to the ring to be magnetized, thereby enabling a more accurate placement and lower field strengths to achieve the required magnetization. One of the coils 22 and its air core 25 are shown in more detail in FIGS. 9 and 10. Coil 22 is composed of cylindrical sections 27, 29, 31 and 33, having progressively smaller diameters. The coil dimensions in turns for these four sections are as follows: 10×16, 8×4, 6×4 and 4×4.

The principle behind the two-step process of coarse and fine convergence correction is that every manufacturing process can be characterized as having two types of deviations from standard; random deviations and those which over time show a significant, calculable pattern. In the case of convergence, deviations of the second type can be represented as a statistical distribution with the normal displaced from zero. The coarse convergence correction of the invention corrects for these predictable errors. In addition, in the case of a ferrite ring, the coarse correction improves the magnetic domain structure of the ring material. The fine correction then can more easily correct for any random convergence errors which may remain in the CRT after the coarse correction.

Figure 3:
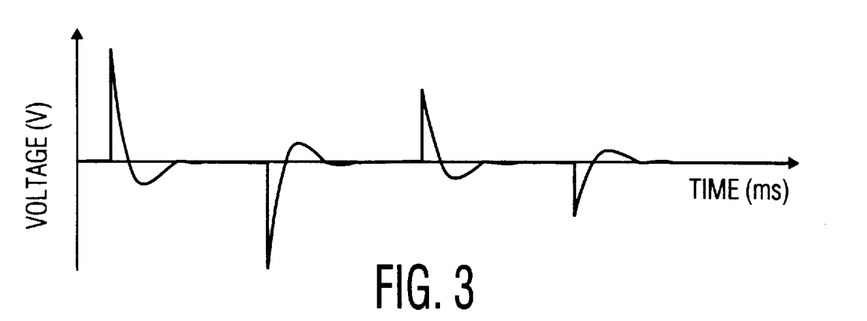
FIGS. 3 and 4 are graphical illustrations of the voltage and current, respectively, of the magnetization coils versus time in milliseconds for the coarse convergence step in accordance with one embodiment of the method of the invention.
Figure 4:
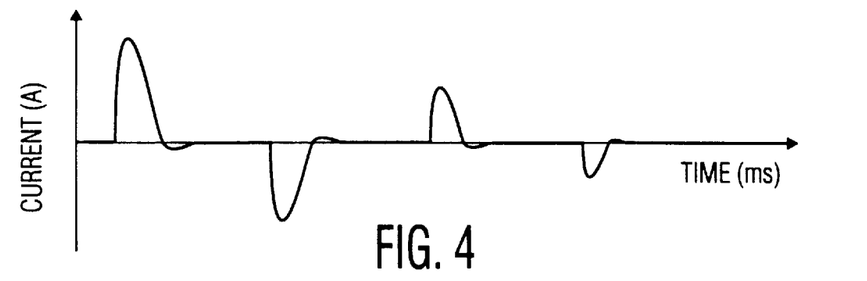

FIGS. 3 and 4 graphically illustrate the voltage and current respectively, versus time for each coil of the magnetizing head used in the coarse correction step in accordance with one embodiment of the magnetization method of the invention. As can be seen from these figures, the initial magnetic saturation pulse is created by an electrical pulse having a peak voltage of 440 V and 420 A and a duration of about 5 milliseconds. Subsequent magnetization pulses of decaying amplitude and alternating polarity are induced by electrical pulses of 330 V, 315 A; 247 V, 236 A; and 186 V, 177 A, respectively, while the duration of the pulses also decays but the duration between pulses remains constant. Such subsequent magnetic pulses induce magnetic domains in the ferrite ring 17 which result in a magnetic field to provide the desired coarse convergence correction of the electron beams.

Figure 5:
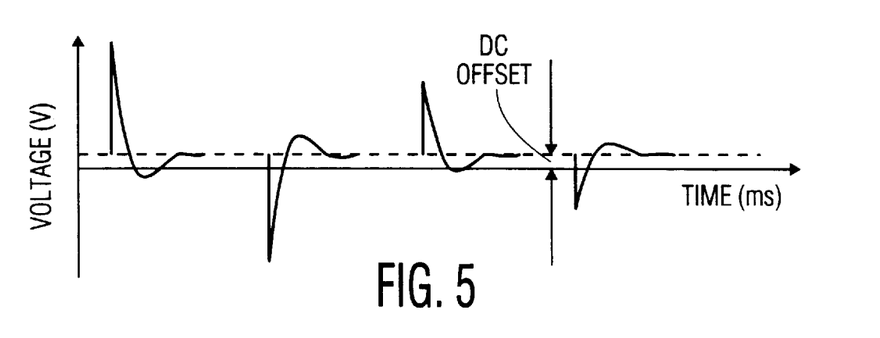
FIGS. 5 and 6 are graphical illustrations similar to those of FIGS. 3 and 4 for the fine convergence correction step.
Figure 6:
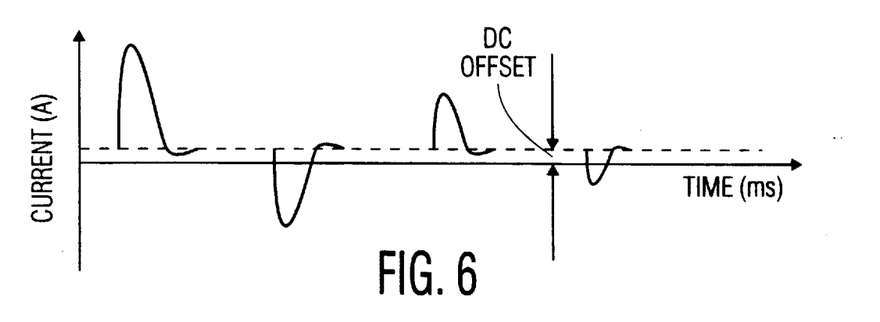

FIGS. 5 and 6 graphically illustrate the voltage and current respectively, versus time for each coil of the magnetizing head used in the fine correction step in accordance with one embodiment of the magnetization method of the invention. As can be seen from these figures, a positive DC offset of 5 V, 5 A, causes an adjustment of the magnetic domains which results in the desired fine convergence correction.

Figure 7:
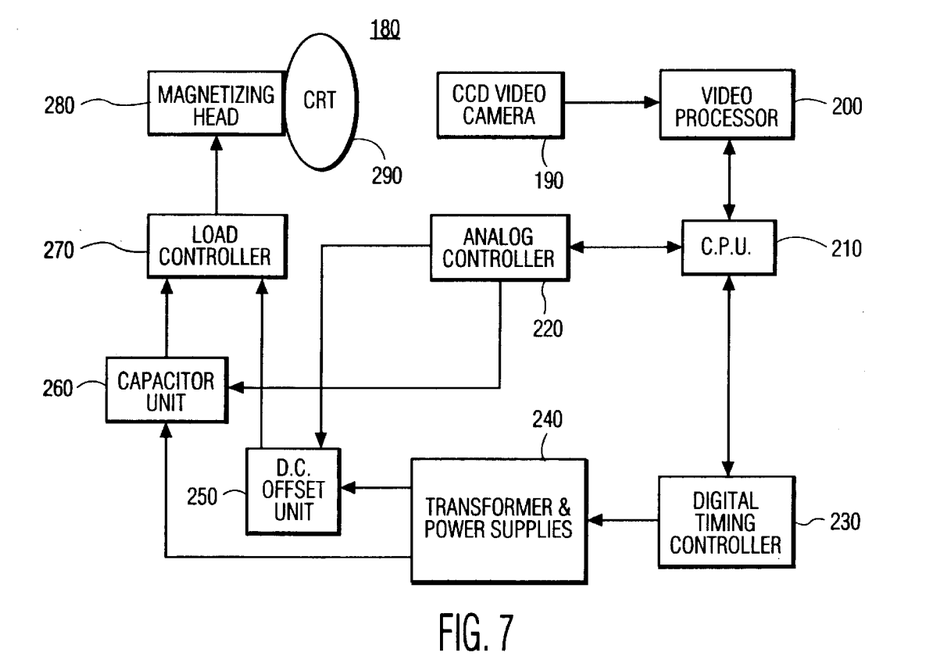
FIG. 7 is a block diagram of one embodiment of the magnetizing apparatus of the invention.

Referring now to FIG. 7, there is shown a block diagram of one embodiment of the apparatus 180 of the invention, including a CCD video camera 190, for measuring convergence errors on the face of CRT 290; a video processor 200 for converting the video camera signal into signals representing convergence errors in the x and y directions for each color (e.g., Blue error in x direction=Bx, Green error in x direction=Gx, etc.); a central processing unit (CPU) 210 for calculating the magnetizing fields needed to correct the measured convergence errors; an air cooled magnetic coil unit 280 for magnetizing the ring; a transformer and power supply unit 240 for supplying power to the coil unit 280; a capacitor unit 260 for supplying high power AC pulses to the coil unit 280; a DC unit 250 for supplying the fine DC offset current to the coil unit 280; a thermally controlled load control unit for channeling power from the capacitor and DC units to the coil unit 280; an analog controller 220 for converting convergence error-correcting magnetic field information from the CPU into analog control signals for the capacitor unit 260 and the DC unit 250; and a digital timing control unit 230, for controlling the timing and sequence of the magnetization process. The load control unit 270 consists of a number of high power, small ohm value (less than 1 ohm) resistors (one for each coil) mounted on heat sinks and cooled by forced air. These resistors serve to limit the current through the coils during capacitor discharge.

Figure 8:
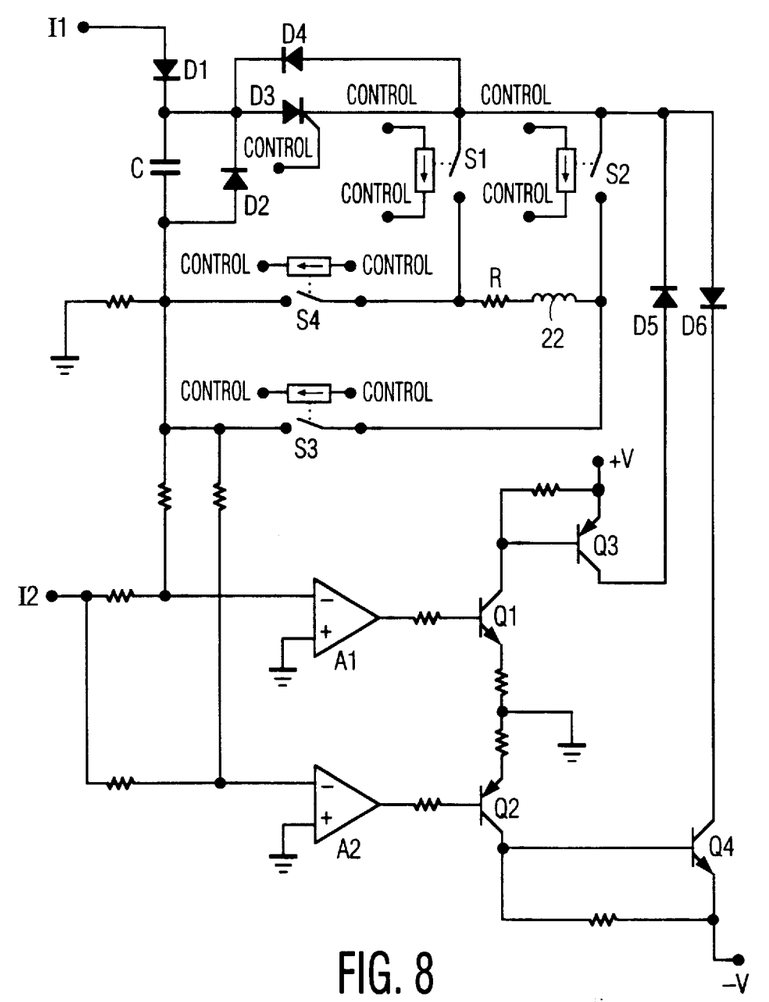
FIG. 8 is a simplified schematic diagram of one channel of the magnetizing apparatus of FIG. 7.

The circuit for one of the eight coil channels is shown schematically in FIG. 8. In operation, capacitor C is charged from power supply 240 via input I1 to the desired level to obtain the magnetic field in the coil 22 needed for magnetization of the ring. Due to the large power surges associated with the discharge of capacitor C, switching takes place in two stages. First, the pair of SCR switches for discharge in one direction (S1 and S3, or S2 and S4) are closed, via control signals from the digital controller 230 via CPU 210. Then, diodes D3 and D4 closed via a control signal from the digital controller 230. By closing SCR switches s1 and s3, the capacitor C is discharged into coil 22 in one direction via resistor R1, providing the current needed for coarse magnetization. By closing SCR switches s2 and s4, the capacitor C is discharged into coil 22 in the opposite direction. Diodes D1 and D2 prevent capacitor C from charging in the opposite direction.

Analog input at I2 from CPU 210 via analog controller 220 is provided to op-amps A1 and A2, and transistors Q1 and Q2, to adjust the collector current in transistors Q3 and Q4, which provide additional current for the fine correction. Rectified DC from power supply 240 provides the reference voltages V+ and V− for transistors Q3 and Q4. Diodes D5 and D6 prevent high frequency ringing current from coil 22 from reaching op amps A1 and A2, and transistors Q1–Q4.

The invention has been described in terms of a limited number of embodiments. Other embodiments and variations of embodiments will become apparent to those skilled in the art, and are intended to be encompassed within the scope of the appended claims.

What we claim as our invention is:

1. A process for correcting static convergence, color purity and frame errors in a CRT by inducing a customized magnetization pattern in a magnetizable ring mounted in the vicinity of the exit end of the electron gun of the CRT, the process comprising the steps of:
   (a) subjecting the ring to a first plurality of localized magnetic fields about the periphery of the ring, each localized field comprising a series of decaying high power magnetic pulses of alternating positive and negative polarity, beginning with an initial pulse of sufficient amplitude to induce a state of magnetic saturation in the ring, and continuing with subsequent pulses of decaying amplitude, the amplitudes of the subsequent pulses being sufficient to induce a custom magnetization in the ring sufficient to achieve a coarse convergence correction of the CRT; and
   (b) subjecting the ring to a second plurality of localized magnetic fields about the periphery of the ring, each localized field comprising a series of decaying high power magnetic pulses of alternating positive and negative polarity, beginning with an initial pulse of sufficient amplitude to induce a state of magnetic saturation in the ring, and continuing with subsequent pulses of decaying amplitude, each localized field additionally comprising a low power magnetic field for offsetting at least the subsequent pulses in order to induce a custom magnetization in the ring sufficient to achieve a fine convergence correction of the CRT, the low power magnetic field for each localized field predetermined to correct any convergence error remaining in the CRT after the coarse correction.

2. The process of claim 1 in which the localized fields are achieved by alternately applying positive-going and negative-going current pulses to each of a set of magnetic coils.

3. The process of claim 2 in which the application of the current pulses to the coils is achieved by sequentially discharging a series of capacitors charged to predetermined levels into each coil.

4. The process of claim 1 in which the amount of the low power offsetting magnetic field needed for fine correction of the static convergence error of the CRT is determined by measuring the residual convergence error after the coarse correction step, and then calculating the amount and sense of the current needed to induce the offsetting field needed from each coil to adjust the magnetization of the ring to achieve convergence of the CRT.

5. The process of claim 2 in which the polarities of adjacent coils are opposed to one another so that the magnetic pulses of the adjacent coils will have a neutralizing effect resulting in no measurable magnetization in the regions of the magnetic ring between these adjacent coils.

6. The process of claim 2 in which the ring is composed of a non-metallic magnetic material, and the process is completed in a total time of between about 1 and 2 seconds, in order to avoid excessive heat build-up in the coils.

7. The process of claim 6 in which the ring is composed of a ferrite magnetic material, and the steps of coarse and fine correction of the CRT are each carried out using a series of from three to five decaying pulses.

8. The process of claim 7 in which the coarse and fine correction steps are each carried out using four pulses decaying from an initial peak above 30 kiloGauss, with a duration of each pulse of from about 0.1 to about 50 milliseconds and a delay between successive pulses of from about 15 milliseconds to about 1 second.

9. The process of claim 8 in which the duration of each pulse is 5 milliseconds, and the delay between successive pulses is 25 milliseconds.

10. The process of claim 7 in which the offsetting low power field strengths for the coarse and fine correction steps are within the range of from zero up to about 500 Gauss.

11. The process of claim 10 in which the accuracy of the offsetting low power field strengths for the fine correction step is within about one milliGauss.

12. The process of claim 1 in which the peak amplitude of the subsequent pulses of the fine correction step is controlled to an accuracy of within 0.1 percent.

13. The process of claim 2 in which the coils have an air core.

14. The process of claim 2 in which the coarse and fine custom magnetization steps are carried out using a magnetizing head of a compact circular arrangement of six to twelve cylindrical coils oriented so that the coil ends are proximate to the ring to be magnetized.

15. The process of claim 14 in which the ends of the coils are tapered or stepped inwardly at their proximate ends.

16. An apparatus for correcting static convergence, color purity and frame errors in a CRT by inducing a customized magnetization pattern in a magnetizable ring mounted in the vicinity of the exit end of the electron gun of the CRT, such apparatus comprising:
   (a) a magnetizing head comprising a plurality of magnetic coils for magnetizing the ring;
   (b) a central processing unit for calculating the fields needed for magnetizing the coils;
   (c) a capacitor unit for supplying high power AC pulses to the coils;
   (d) a DC unit for supplying a DC offset to the coils;
   (e) means for supplying power to the capacitor unit and the DC unit;
   (f) means for limiting the current from the capacitor unit and the DC unit to the coils;
   (g) an analog controller for converting convergence error-correcting magnetic field information from the central processing unit into analog control signals for the capacitor unit and the DC unit; and
   (h) means connected to the central processing unit for controlling the timing and sequence of the magnetization process.

17. The apparatus of claim 16 in which the magnetization head is air cooled.

18. The apparatus of claim 16 in which the current limiting means is air cooled.

19. The apparatus of claim 16 in which the current limiting means comprises a resistor for each coil of the magnetizing head.

20. The apparatus of claim 19 in which each resistor is mounted on a heat sink.

21. The apparatus of claim 16, in which a video camera is included for imaging a display on the CRT, and a video processor is included for converting the image signal into signals representing convergence errors.

22. The apparatus of claim 16 in which the magnetizing head comprises a series of magnetization coils mounted in a compact circular arrangement of six to twelve cylindrical coils oriented to surround the ring to be magnetized.

23. The apparatus of claim 22 in which the magnetizing coils are tapered or stepped inwardly at their proximate ends to permit a compact arrangement of the coils.

* * * * *